(12) United States Patent
Goredema et al.

(10) Patent No.: US 9,120,943 B2
(45) Date of Patent: Sep. 1, 2015

(54) BIO-RENEWABLE PHASE CHANGE INKS

(71) Applicant: XEROX CORPORATION, Norwalk, CT (US)

(72) Inventors: Adela Goredema, Mississauga (CA); Jennifer Belelie, Oakville (CA); James Daniel Mayo, Mississauga (CA); Daryl W. Vanbesien, Burlington (CA); Barkev Keoshkerian, Thornhill (CA); Nathan Bamsey, Burlington (CA); Jenny Eliyahu, Maple (CA)

(73) Assignee: XEROX CORPORATION, Norwalk, CT (US)

( * ) Notice: Subject to any disclaimer, the term of this patent is extended or adjusted under 35 U.S.C. 154(b) by 46 days.

(21) Appl. No.: 14/053,601

(22) Filed: Oct. 15, 2013

(65) Prior Publication Data

US 2015/0101508 A1   Apr. 16, 2015

(51) Int. Cl.
| | |
|---|---|
| *C09D 11/02* | (2014.01) |
| *C09D 11/328* | (2014.01) |
| *C09D 11/34* | (2014.01) |
| *C08K 5/12* | (2006.01) |
| *C08K 5/18* | (2006.01) |
| *C08K 5/20* | (2006.01) |
| *C08K 5/3417* | (2006.01) |
| *C09D 11/322* | (2014.01) |

(52) U.S. Cl.
CPC ............... *C09D 11/328* (2013.01); *C08K 5/12* (2013.01); *C08K 5/18* (2013.01); *C08K 5/20* (2013.01); *C08K 5/3417* (2013.01); *C09D 11/322* (2013.01); *C09D 11/34* (2013.01)

(58) Field of Classification Search
CPC ...................................... C09D 11/34
USPC ...................................... 106/31.61
See application file for complete search history.

(56) References Cited

U.S. PATENT DOCUMENTS

| | | |
|---|---|---|
| 4,490,731 A | 12/1984 | Vaught |
| 5,195,430 A | 3/1993 | Rise |
| 5,231,135 A | 7/1993 | Machell et al. |
| 5,389,958 A | 2/1995 | Bui et al. |
| 5,621,022 A | 4/1997 | Jaeger et al. |
| 6,221,137 B1 | 4/2001 | King et al. |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |
| 7,381,831 B1 | 6/2008 | Banning et al. |
| 7,427,323 B1 | 9/2008 | Birau et al. |
| 7,973,186 B1 | 7/2011 | Goredema et al. |
| 8,500,896 B2 | 8/2013 | Morimitsu et al. |
| 8,506,040 B2 | 8/2013 | Belelie et al. |
| 2013/0284063 A1* | 10/2013 | Goredema et al. .......... 106/31.61 |
| 2014/0137767 A1* | 5/2014 | Carlini et al. ............... 106/31.13 |
| 2014/0142231 A1* | 5/2014 | Vanbesien et al. ............ 524/296 |

OTHER PUBLICATIONS

Adela Goredema, U.S. Appl. No. 13/681,106, filed Nov. 19, 2012, Bio-Renewable Fast Crystalizing Phase Change Inks, USA.
Adela Goredema, U.S. Appl. No. 13/680,322, filed Nov. 19, 2012, Ink Compositions Incorporating Ester Resins, USA.

* cited by examiner

*Primary Examiner* — Veronica F Faison
(74) *Attorney, Agent, or Firm* — Pillsbury Winthrop Shaw Pittman LLP

(57) ABSTRACT

A phase change ink composition suitable for ink jet printing, including printing on coated paper substrates. In embodiments, the phase change ink composition comprises a bio-renewable crystalline component and amorphous component which provides for a robust ink composition. In embodiments, the amorphous component is derived from low cost, stable and bio-renewable materials comprising aromatic rosin esters.

20 Claims, 2 Drawing Sheets

BIO-RENEWABLE PHASE CHANGE INKS

CROSS REFERENCE TO RELATED APPLICATIONS

Reference is made to commonly owned and co-pending, U.S. patent application Ser. No. 14/052,865, filed electronically on the same day as the present application, entitled "Phase Change Ink Containing Amorphous Amides," having the named inventors Naveen Chopra, Adela Goredema, Kentaro Morimitsu, Barkev Keoshkerian, Jennifer L. Belelie, and Gabriel Iftime, the entire disclosure of which is incorporated herein by reference in its entirety; U.S. patent application Ser. No. 14/052,873, filed electronically on the same day as the present application, entitled "Amorphous Amides," having the named inventors Naveen Chopra, Adela Goredema, Kentaro Morimitsu, Barkev Keoshkerian, and Jennifer L. Belelie, the entire disclosure of which is incorporated herein by reference in its entirety; U.S. patent application Ser. No. 14/053,569, now U.S. Pat. No. 9,056,998 entitled "Novel Crystalline Compounds for Phase Change Inks" having the named inventors Adela Goredema, Guerino Sacripante, Kentaro Morimitsu, Naveen Chopra and Stephan Drappel, the entire disclosure of which is incorporated herein by reference in its entirety; and U.S. patent application Ser. No. 14/053,592, now U.S. Pat. No. 9,011,587, filed electronically on the same day as the present application, entitled "Phase Change Inks Comprising Novel Crystalline Compounds," having the named inventors Adela Goredema, Guerino Sacripante, Barkev Keoshkerian, Daryl Vanbesien, Kentaro Morimitsu, Naveen Chopra and Gabriel Iftime, the entire disclosure of which is incorporated herein by reference in its entirety.

BACKGROUND

The present embodiments relate to phase change ink compositions characterized by being solid at room temperature and molten at an elevated temperature at which the molten ink is applied to a substrate. These phase change compositions can be used for ink jet printing. The present embodiments are directed to a novel phase change ink composition comprising an amorphous compound or component, a crystalline compound or component, and optionally a colorant, and methods of making the same. In the present embodiments, the amorphous component comprises an aromatic rosin ester. The specific formulations described herein, including a combination of an amorphous compound and crystalline compound which are derived from low cost, stable and bio-renewable materials, provide robust ink compositions that form high quality images when printing on coated paper substrates.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In piezo ink jet printing processes employing phase change inks, the ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks" or "solid inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions, preferably those derived from bio-renewable sources, for phase change ink compositions and future printing technologies to provide customers with excellent image quality on all substrates. There is further a need to provide such phase change ink compositions which are suitable for fast printing environments like production printing.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided novel phase change ink compositions comprising an amorphous and crystalline material which are suitable for ink jet high speed printing, such as printing on coated paper substrates. In particular, the amorphous material is also derived from bio-renewable materials.

In particular, the present embodiments provide a phase change ink comprising: a crystalline component; an amorphous component being an aromatic rosin ester; and an optional colorant.

In further embodiments, there is provided a phase change ink comprising: a crystalline component; an amorphous component being an aromatic rosin ester; a pigment; and a pigment dispersant.

In yet other embodiments, there is provided a phase change ink comprising: a crystalline component; an amorphous component being an aromatic rosin ester; and a colorant, wherein the amorphous component and the crystalline component comprise at least 80% by weight of bio-renewable content.

BRIEF DESCRIPTION OF THE DRAWINGS

For a better understanding of the present embodiments, reference may be had to the accompanying figures.

DETAILED DESCRIPTION

Figure 1:
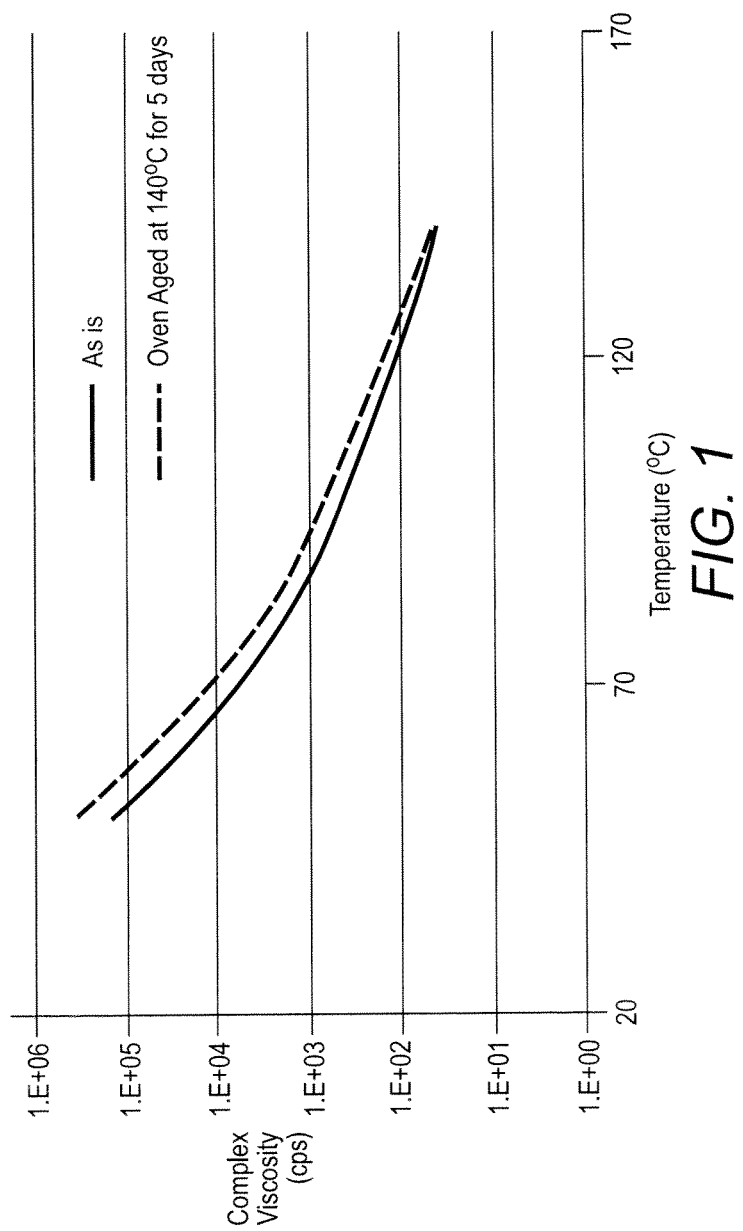
FIG. 1 is a graph illustrating rheology data of an aromatic rosin ester according to the present embodiments.

In the following description, it is understood that other embodiments may be utilized and structural and operational changes may be made without departure from the scope of the present embodiments disclosed herein.

Solid or phase change ink technology broadens printing capability and customer base across many markets, and the diversity of printing applications will be facilitated by effective integration of printhead technology, print process and ink materials. The phase change ink compositions are characterized by being solid at room temperature (RT) (e.g., 20-27° C.) and molten at an elevated temperature at which the molten ink is applied to a substrate. As discussed above, while current ink options are successful for porous paper substrates, these options are not always satisfactory for coated paper substrates.

Conventional phase change ink technology has been successful in producing vivid images and providing economy of jet use and substrate latitude on porous papers. However, such technology has not been satisfactory for coated substrates. Thus, while known compositions and processes are suitable for their intended purposes, a need remains for additional means for forming images or printing on coated paper substrates. As such, there is a need to find alternative compositions for phase change ink compositions and future printing technologies to provide customers with excellent image quality on all substrates, including selecting and identifying different classes of materials that are suitable for use as desirable ink components.

For example, energy and environmental policies, increasing and volatile oil prices, and public/political awareness of the rapid depletion of global fossil reserves have created a need to find sustainable monomers derived from bio-renewable materials. The present embodiments use bio-renewable materials for use in the ink compositions. The term "bio-renewable" is used to mean a material comprised of one or more monomers that are derived from plant material. By using such bio-derived feedstock, which are renewable, manufacturers may reduce their carbon footprint and move to a zero-carbon or even a carbon-neutral footprint. Bio-renewable materials are also very attractive in terms of specific energy and emission savings. Utilizing bio-renewable feedstock can decrease the amount of waste targeted for landfills, and reduce the economic risks and uncertainty associated with reliance on petroleum imported from unstable regions.

It was previously discovered that using a mixture of crystalline and amorphous small molecule compounds in phase change ink formulations provides robust inks, and in particular, phase change inks which demonstrate robust images on coated paper, as disclosed in U.S. Pat. No. 8,506,040 to Jennifer L. Belelie et al., and hereby incorporated by reference in its entirety. Print samples made with such phase change inks demonstrate better robustness with respect to scratch, fold, and fold offset as compared to currently available phase change inks.

The present embodiments provide a phase change ink that meets benchmark performance, competitive cost, and environmental sustainability. In particular, the present ink compositions incorporate aromatic rosin esters as the amorphous binder within the ink formulation with a crystalline component. In further embodiments, the ink formulation also comprises pigment, pigment dispersants and synergist. The aromatic rosin esters facilitate ink adhesion onto paper substrates and perform particularly well on coated papers such as Digital Color Elite Gloss (DCEG)-120 gsm paper. The aromatic rosin esters are also low cost stable raw materials. These materials are derived from rosin acids which are extracted from pine sap. The present embodiments thus provide a formulation for ink compositions that are based on crystalline and amorphous components which not only provide robust inks, and in particular, phase change inks which demonstrate robust images on coated paper (e.g., excellent scratch and fold on DCEG paper and further are derived from low cost, stable and bio-renewable materials. The present embodiments provide a new type of ink jet phase change ink composition which comprises a blend of (1) crystalline and (2) amorphous compounds, generally in a weight ratio of from about 60:40 to about 95:5, respectively. In more specific embodiments, the weight ratio of the crystalline to amorphous compound is from about 65:35 to about 95:5, or is from about 70:30 to about 90:10.

Each compound or component imparts specific properties to the phase change inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

In embodiments, the present embodiments provide inks that comprise greater than 70% bio-renewable content, or from about 70 to about 80% bio-renewable content, or from about 70 to about 75% bio-renewable content. This means that at least 70% of the ink components are derived from renewable resources such as plants. The amorphous materials are inexpensive, biodegradable and from bio-renewable sources. The phase change inks made from these materials demonstrate excellent robustness, with respect to scratch, fold, and fold offset, compared to commercially available phase change inks on the same substrate.

In embodiments, the phase change inks meet certain specific physical properties. For example, the phase change inks of the present embodiments have a melting point ($T_{melt}$)< 150° C. or from about 60° C. to about 140° C., or from about 70° C. to about 130° C. In other embodiments, the ink has a $T_{crys}$>60° C. or from about 65° C. to about 110° C., or from about 70° C. to about 100° C., In other embodiments, the ink of the present embodiments has a viscosity of from about 1 to about 22 cps in a jetting range of from about 100 to about 140° C. In particular, the ink of the present embodiments has a viscosity at 140° C. of <12 cps or from about 12 cps to about 3 cps, or from about 10 cps to about 5 cps. The ink may have a viscosity of greater than about $10^6$ cps at room temperature. In further embodiments, the phase change ink has an average particle size of from about 50 nm to about 400 nm, measured as described in U.S. patent application Ser. No. 13/680,322, which is hereby incorporated by reference.

The Amorphous Compound

In embodiments, the amorphous compound functions as the binder agent for the crystalline component and any colorants or other minor additives. The present embodiments use aromatic rosin. These materials are derived from rosin acids which are extracted from pine sap. Natural rosin acids have double bonds. To obtain aromatic rosin acids, the materials are subjected to a disproportion (dehydrogenation) process to form aromatic bonds. The conversion of double bonds to aromatic bonds improves the thermal stability of the materials. The resulting carboxylic acid group is then reacted with different alcohols to give aromatic rosin esters.

In specific embodiments, the aromatic rosin ester is selected from the group consisting of

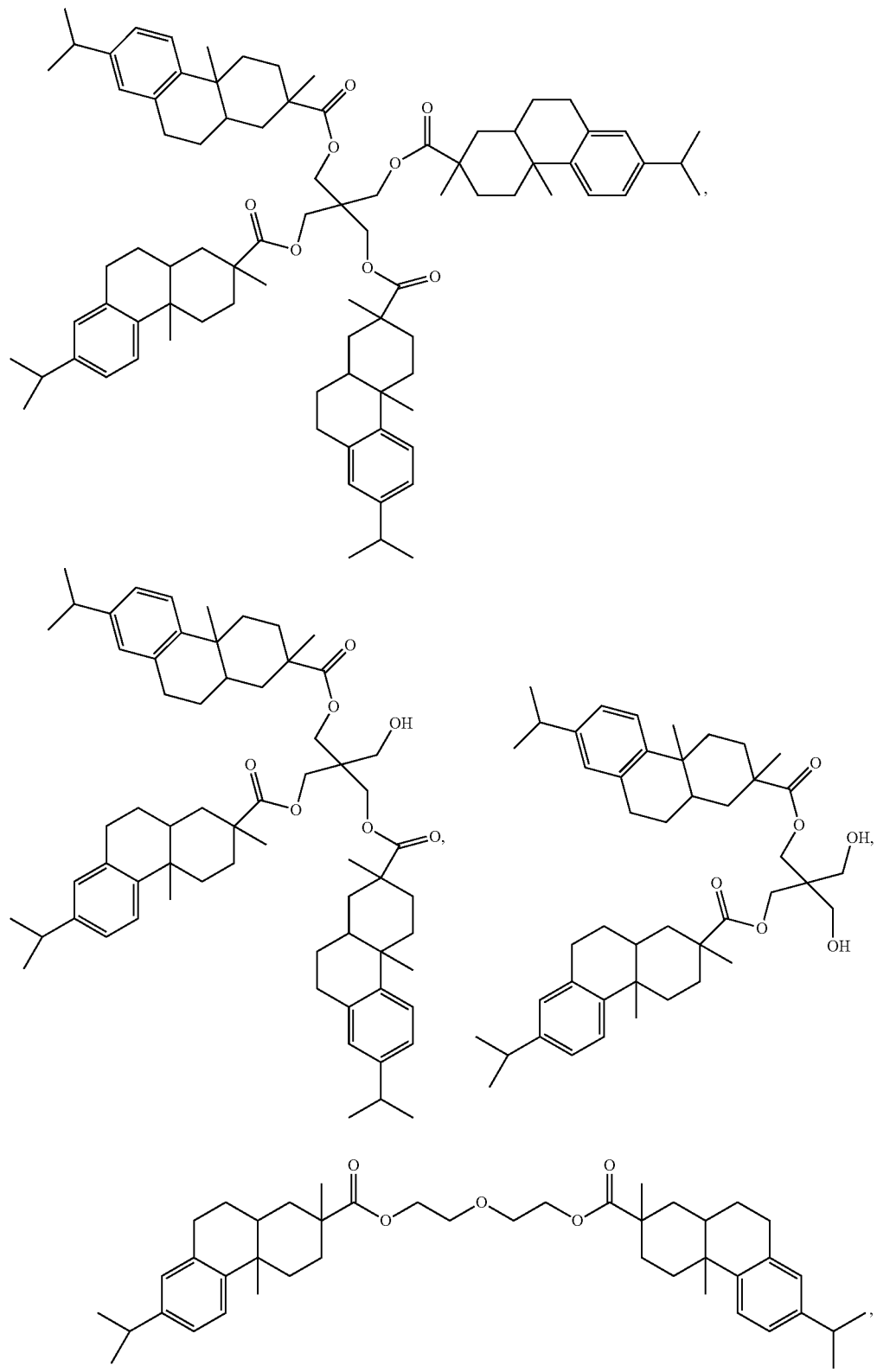

and mixtures thereof. In further embodiments, the amorphous component comprises a mixture of

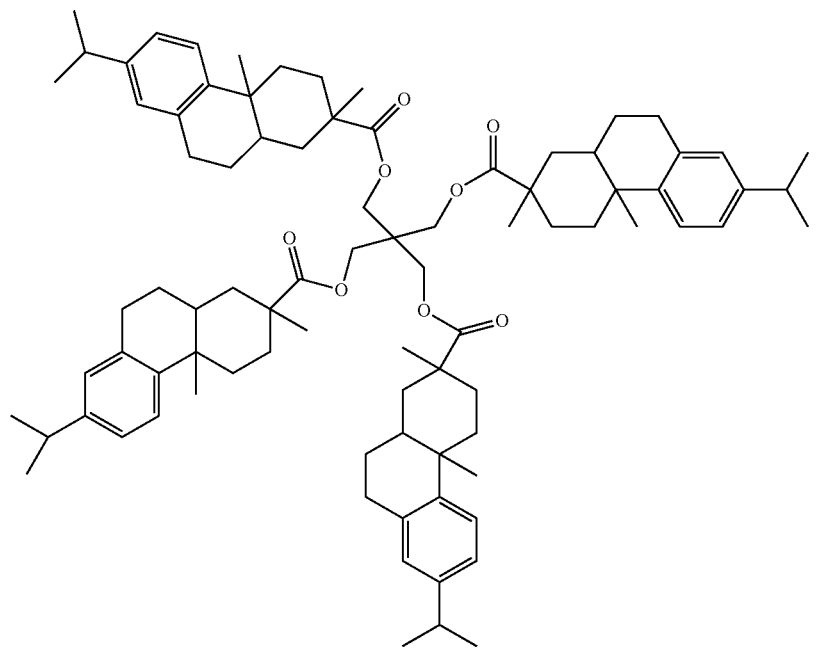 [SMILES: CC(C)c1ccc2c(c1)CCC1CC(C)(C(=O)OCC(COC(=O)C3(C)CCC4(C)c5ccc(C(C)C)cc5CCC4C3)(COC(=O)C3(C)CCC4(C)c5ccc(C(C)C)cc5CCC4C3)COC(=O)C3(C)CCC4(C)c5ccc(C(C)C)cc5CCC4C3)CCC21C]

in a range of from about 5% to about 15%, or from about 5% to about 10% percent by weight of the total weight of the amorphous component,

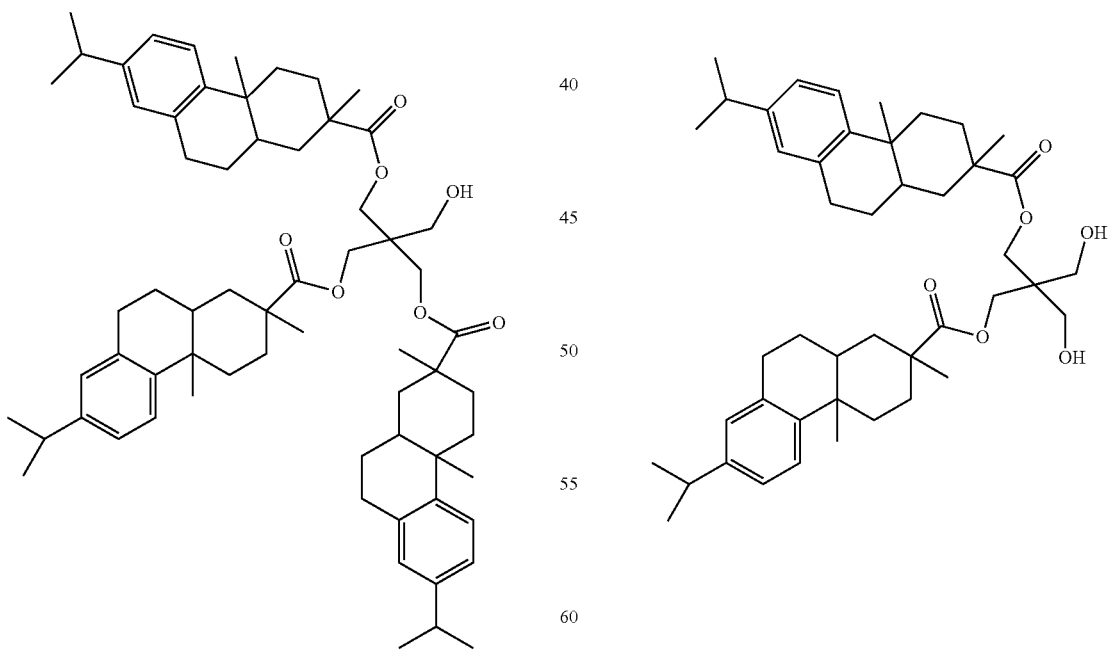

in a range of from about 1% to about 6%, or from about 1% to about 3%, percent by weight of the total weight of the amorphous component, in a range of from about 3% to about 8%, or from about 4% to about 6%, percent by weight of the total weight of the amorphous component, and

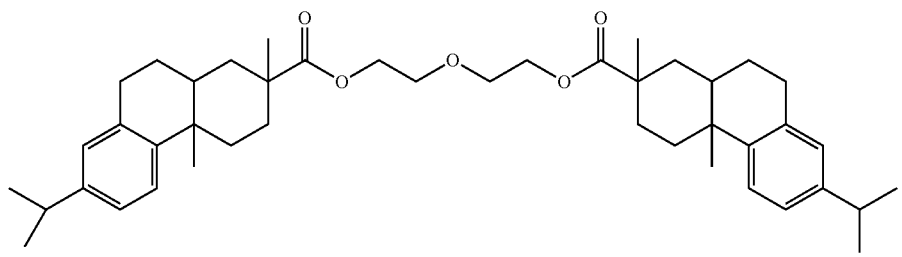 [SMILES: CC(C)c1ccc2c(c1)CCC1CC(C)(C(=O)OCCOCCOC(=O)C3(C)CCC4(C)c5ccc(C(C)C)cc5CCC4C3)CCC21C]

in a range of from about 75% to about 90%, or from about 75% to about 85%, percent by weight of the total weight of the amorphous component.

An example of these commercial aromatic resins is Sylvatac RE, commercially available from Arizona Chemicals (Savannah, Ga.). It is a mixture of esters produced from the reaction of the rosin acid with 2-Hydroxymethyl-1,3-propanediol and small amounts of pentaerythritol. Table 1 below shows the composition of Sylvatac RE 40 which was derived from MAEDI analysis.

TABLE 1

Composition of Sylvatac RE 40

| Theoretical Mass (Da) | Structure | Percentage (%) |
|---|---|---|
| 1287.8562 | | 7.2 |

TABLE 1-continued
Composition of Sylvatac RE 40
| Theoretical Mass (Da) | Structure | Percentage (%) |
|---|---|---|
| 1005.6579 | 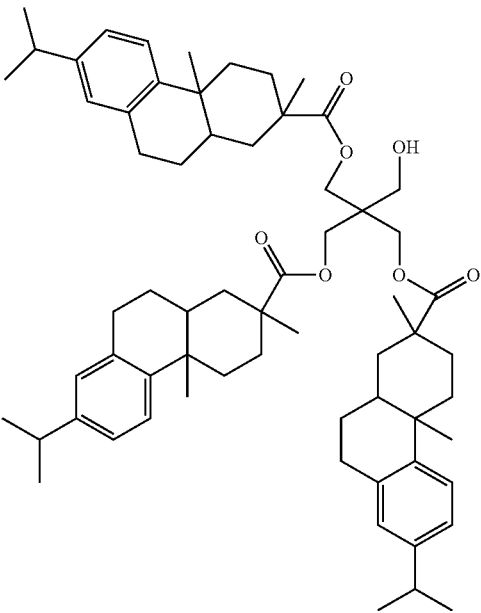 [SMILES: CC(C)c1ccc2c(c1)CCC1CC(C)(C(=O)OCC(CO)(COC(=O)C3(C)CCC4(C)c5ccc(C(C)C)cc5CCC4C3)COC(=O)C3(C)CCC4(C)c5ccc(C(C)C)cc5CCC4C3)CCC21C] | 2.2 |
| 723.4595 | 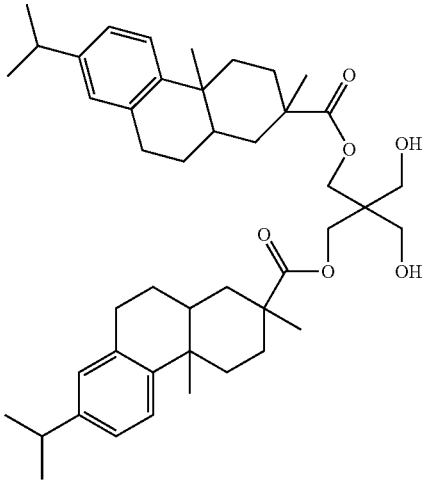 [SMILES: CC(C)c1ccc2c(c1)CCC1CC(C)(C(=O)OCC(CO)(CO)COC(=O)C3(C)CCC4(C)c5ccc(C(C)C)cc5CCC4C3)CCC21C] | 4.7 |
| 411.2506 | 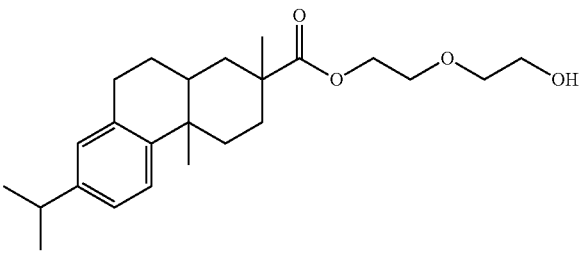 [SMILES: CC(C)c1ccc2c(c1)CCC1CC(C)(C(=O)OCCOCCO)CCC21C] | 1.9 |

TABLE 1-continued

Composition of Sylvatac RE 40

| Theoretical Mass (Da) | Structure | Percentage (%) |
|---|---|---|
| 255.2107 | [structure with H$^+$] | 3.2 |
| 693.4489 | [diester structure] | 80.8 |

Required properties for an amorphous binder to be used in the present embodiments for a robust phase change ink include low Tg, low viscosity and stability at elevated temperatures. In embodiments, the amorphous components has a Tg of from about −10° C. to about 30° C., or from about −10° C. to about 25° C., A number of commercial binders from Arizona Chemicals were assessed and below are some of the measured properties.

TABLE 2

Glass Transition Temperature (Tg) of Commercial Rosin Ester Binders

| Binder | Tg (° C.) |
|---|---|
| Sylvatac RE 40 | 4.7 |
| Sylvatac RE 25 | −9.6 |
| Sylvatac RE 85 | 39 |
| Unitac 70 | 37.7 |
| Sylvalite RE 80HP | 35.8 |
| Sylvalite RE 85L | 39 |
| Sylvalite 100L | 50.4 |

Inks made from these amorphous binders need to be stable at the jetting temperature for prolonged periods of time. As a result the amorphous compounds also need to be stable at these high temperatures. In one embodiment, Sylvatac RE 40 was aged in the oven at 140° C. for 5 days and did not show any significant increase in viscosity (i.e., not increase more than 10 cPs) at 140° C. as shown in FIG. 1.

The amorphous compounds show relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

In embodiments, the amorphous material is present in an amount of from about 5 percent to about 40 percent by weight, or from about 10 percent to about 35 percent by weight, or from about 15 percent to about 30 percent by weight of the total weight of the ink composition.

In embodiments, the amorphous compounds are formulated with a crystalline compound to form a phase change ink composition. As previously stated, the acids used to make the rosin ester binders are derived from pine sap and have at least 80% bio-renewable content. The crystalline compounds used are likewise bio-renewable and have at least 80% bio-renewable content. The resulting Inks of this invention have a bio-renewable content of greater than 70%. The resulting ink compositions show good rheological profiles. Print samples created by the phase change ink composition on coated paper exhibit excellent robustness.

The Crystalline Compound

As stated above, the crystalline compounds are all of high bio-renewable content. In particular, the fatty alcohols used to make the crystalline compounds are derived from plants giving these components at least 80% bio-renewable content.

Inks of the present embodiments use the crystalline compounds listed in Table 3. The listed references are hereby incorporated by reference in their entireties.

TABLE 3

Crystalline Compounds

| No. | Structure | Reference |
|---|---|---|
| 1 | $H_3C(H_2C)_{17}$—O—[terephthalate]—O—$(CH_2)_{17}CH_3$<br>Distearyl Terepthalate (DST) | U.S. Pat. Appln. Ser. No. 13/681,106 to Goredema et al. |

TABLE 3-continued

Crystalline Compounds

| No. | Structure | Reference |
|---|---|---|
| 2 | H₃C(H₂C)₂₁—O—C(O)—C₆H₄—C(O)—O—(CH₂)₂₁CH₃<br>Didocosyl Terepthalate | U.S. Pat. Appln. Ser. No. 13/681,106 to Goredema et al. |

The bio-renewable content is based on the weight percent of bio-based materials. All of the starting materials used to make the crystalline components of the present embodiments are inexpensive and safe.

The crystalline materials show sharp crystallization, relatively low viscosity ($\leq 10^1$ centipoise (cps), or from about 0.5 to about 20 cps, or from about 1 to about 15 cps at a temperature of about 140° C., but very high viscosity ($>10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The $\Delta T$ between $T_{melt}$ and $T_{crys}$ is less than about 55° C. The selected crystalline materials provide the resulting ink with fast crystallization properties.

In embodiments, the crystalline material is present in an amount of from about 60 percent to about 95 percent by weight, or from about 65 percent to about 95 percent by weight, or from about 70 percent to about 90 percent by weight of the total weight of the ink composition.

Additives

The ink of embodiments may further include conventional additives to take advantage of the known functionality associated with such conventional additives. Such additives may include, for example, at least one antioxidant, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis(4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Colorants

In embodiments, the phase change ink compositions described herein also include a colorant. The ink of the present embodiments can thus be one with or without colorants. The phase change ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36

(C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, 07080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow 01355 (BASF); Suco Fast Yellow 01355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DUPONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. In specific embodiments the pigment may be stabilized by an amine based dispersant described in U.S. Pat. No. 7,973,186. In certain embodiments, the amine based dispersant has a structure of Formula II:

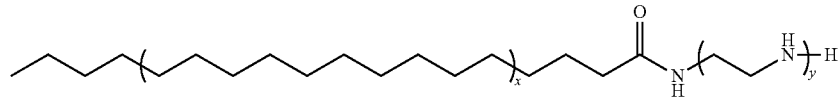

Formula II wherein x is from about 1 to about 10, and y is from about 10 to about 10,000. In certain of such embodiments, x is from about 2 to about 8 or from about 3 to about 5. In certain of such embodiments, y is from about 5 to about 20 or from about 9 to about 14. In a specific embodiment, the amine based dispersant has the following structure:

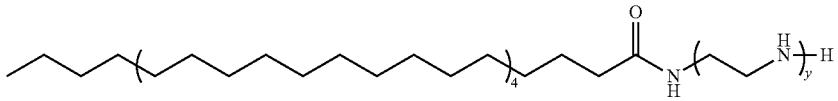

wherein y is from about 9 to about 14 (Compound A).

The dispersant in the pigment concentrate may be present in an amount of from about 2 percent weight to about 40 percent weight, from about 5 percent weight to about 35 percent weight, or from about 10 percent weight to about 30 percent weight based on the total weight of the pigment concentrate.

Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 20 percent by weight of the ink, at least from about 1 percent by weight of the ink to about 15 percent by weight of the ink, and at least from about 2 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Preparation of Ink Compositions

Inks were formulated using mixtures of the bio-renewable amorphous compounds listed in Table 2 and crystalline compounds listed in Table 3. Table 4 below shows the prepared ink formulations.

TABLE 4

Sustainable Phase Change Inks Comprising Aromatic Rosin Esters

| | | Ink Example 1 | Ink Example 2 | Ink Example 3 | Ink Example 4 | Ink Example 5 | Ink Example 6 |
|---|---|---|---|---|---|---|---|
| Crystalline Component | Distearyl Terepthalate (DST) (BRC = 80%) | | 78.4 | 76.48 | 76.48 | | |
| | Didocosyl Terepthalate (BRC = 83%) | 78.4 | | | | | |
| Amorphous component | TBCT* (BRC ~40%) | | | | | | |
| | Sylvatac RE 40 (BRC ~80%) | 19.6 | 19.6 | 19.12 | | | |
| | Sylvatac RE 25 ((BRC ~80%) | | | | 19.12 | | |
| | Sylvatac RE85L | | | | | 19.12 | |
| | Sylvatac RE 80HP | | | | | | 19.12 |
| Amine Diespersant Described in U.S. Pat. No. 7,973,186 | | | | 2 | 2 | 2 | 2 |
| SunFlo SFD-B124 Synergist | | | | 0.4 | 0.4 | 0.4 | 0.4 |
| Keystone Solvent blue 101 Dye | | 2 | 2 | | | | |
| Hostapern B4G Cyan Pigment | | | | 2 | 2 | 2 | 2 |
| Total | | 100 | 100 | 100 | 100 | 100 | 100 |
| BRC (%)** | | ~80 | ~78 | ~77 | ~77 | ~77 | ~77 |
| Viscosity @ 140° C. (cPs)*** | | 5.30 | 5.43 | 6.67 | 6.88 | 7.18 | 6.48 |
| Tcryst. (° C.) (by rheology) | | 85 | 80 | 80 | 80 | 80 | 80 |

*Reaction product of a 1:1:1 molar ratio of 4-t-butylcyclohexanol, cyclohexanol and tartaric acid, synthesized as outlined in U.S. Pat. No. 8,500,896.
**Bio-renewable content-weight percent of bio-based materials
***Frequency = 1 Hz; 25 mm parallel plate geometry; gap = 0.2 mm; strain % = 400%

Example 1

Ink Example 1

Figure 2:
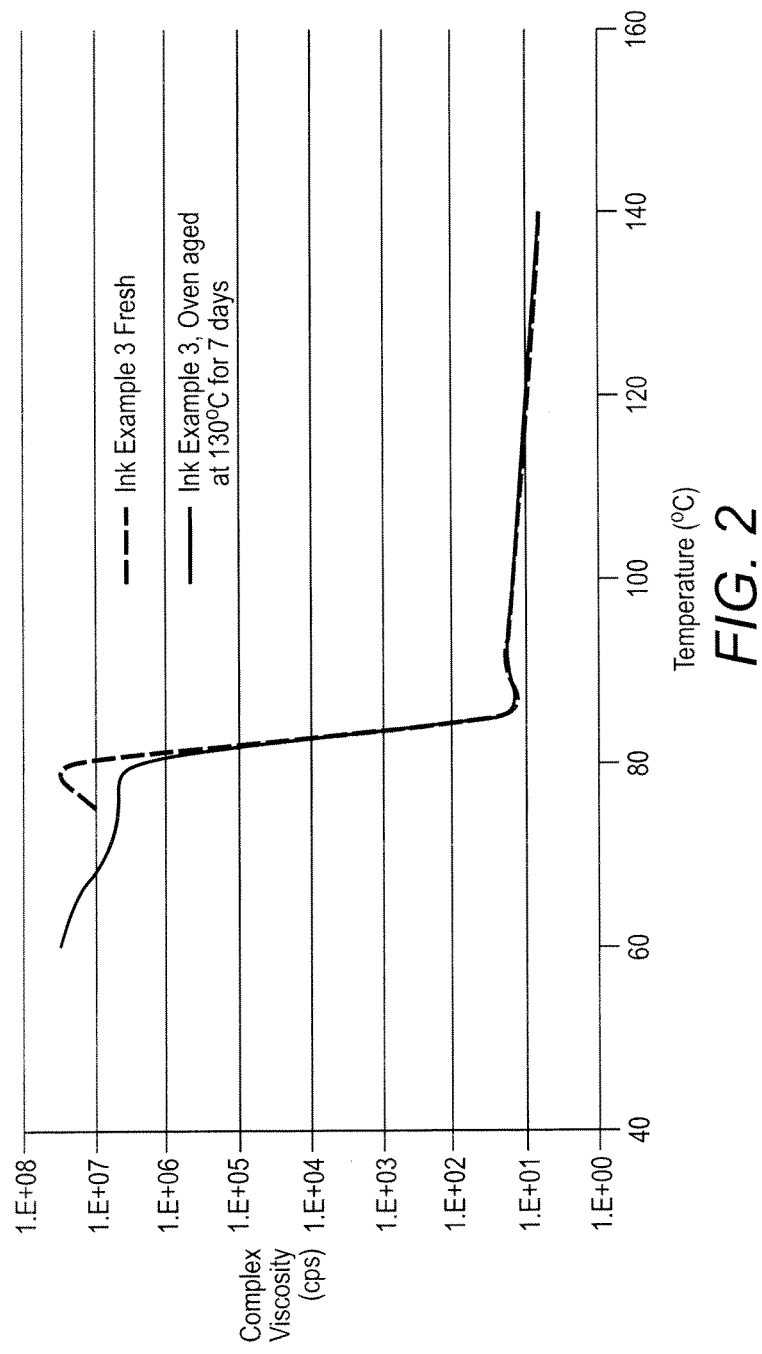
FIG. 2 is a graph illustrating rheology data of inks made according to the present embodiments as compared to a control ink.

Into a 30 mL amber bottle was charged, in the following order: 3.92 g of didocosyl terepthalate (Compound 3 of Table 3, 78.4 wt %) and 0.98 g of Sylvatac RE 40 (commercial amorphous binder shown in Table 1). The materials were melted at 140° C. and stirred using a magnetic stir bar for 30 minute after which was added 0.1 g Keyplast Solvent blue 101 dye (2 wt %, purchased from Keystone) to the molten mixture. The ink was stirred for an additional 1 hour at 140° C., poured in an Aluminum tray and cooled to room temperature. The rheology of this ink was measured and is shown in FIG. 2.

Example 2

Ink Example 2

Ink Example 2 was made using the same procedure as in Ink Example 1 except distearyl terepthlate (DST) was used in place of didocosyl terepthlate. Rheology was measured and is shown in Table 4.

Example 3

Ink Example 3

Pigment Concentrate Procedure

In a beaker was added 72 g of DST, 40 g amine based dispersant (custom dispersant described in U.S. Pat. No. 7,973,186, which is hereby incorporated by reference), and 8 g SunFlo SFD-B124 Synergist. The solution was stirred for 30 minutes at 130° C., and was added 40 grams Cyan B4G pigment and stirred for an additional 1 hour at 130° C. This is referred to as the pigment wetting phase. This mixture was then transferred to a 100 mL attritor vessel containing 1800 g of ⅛ inch stainless steel shots. The mixture was stirred at 350 RPM for 24 hours at 130° C. The pigment concentrate was then sieved of shots and measured for particle size.

Ink Preparation

In a 50 mL beaker was added 1.33 g pigment concentrate, 6.75 g DST, and 1.91 g Sylvatac RE 40. The mixture was then stirred at 130° C. for 2 hours and poured into a pan to freeze (solidify). The rheology was then measured and results are shown in Table 4.

Ink Examples 4-6

Ink Examples 4-6 were made using the same procedure as in Ink Example 3 except other amorphous binders shown in table 4 were used in place of Sylvatac RE 40. The rheology was then measured and results are shown in Table 4.

Evaluation of Inks

FIG. 2 shows the rheology of ink example 3 fresh and aged sample. Ink rheology was not changed by aging it in the oven at elevated temperatures for 7 days. Ink 4-6 had very low viscosity and can be jetted below 120° C.

Image Robustness

The ink examples 3-6 were printed using a modified Xerox Phaser 8860 printer onto Digital Color Elite Gloss, 120 gsm (DCEG), to form robust images that could not be easily removed from the substrates. When a scratch/gouge finger with a curved tip at an angle of about 15° from vertical, with a weight of 528 g applied, was drawn across the image at a rate of approximately 13 mm/s no ink was visibly removed from the images made with ink examples 3 and 4. Images made from ink examples 5 and 6 had some ink removed. The scratch/gouge tip is similar to a lathe round nose cutting bit with radius of curvature of approximately 12 mm. Some of the images were folded along with a XEROX Business 4200 (75 gsm) facing page in a Duplo D-590 folder and evaluated for fold crease and fold offset. Images from ink examples 3 and 4 showed no offset and ink examples 5 and 6 had some offset. Ink examples 3 and 4 were made using lower Tg amorphous binders and ink examples 5 and 6 were made with higher Tg amorphous binders. As Tg increases, image robustness degrades.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
   a crystalline component;
   an amorphous component being an aromatic rosin ester; and
   an optional colorant.

2. The phase change ink of claim 1 further comprising a colorant selected from the group consisting of a pigment, dye or mixtures thereof.

3. The phase change ink of claim 1, wherein the aromatic rosin ester is selected from the group consisting of

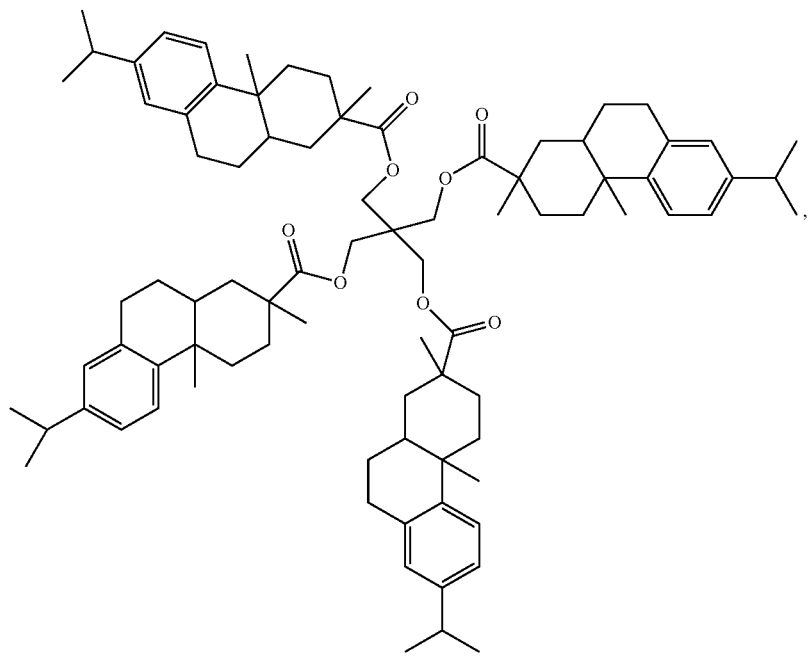

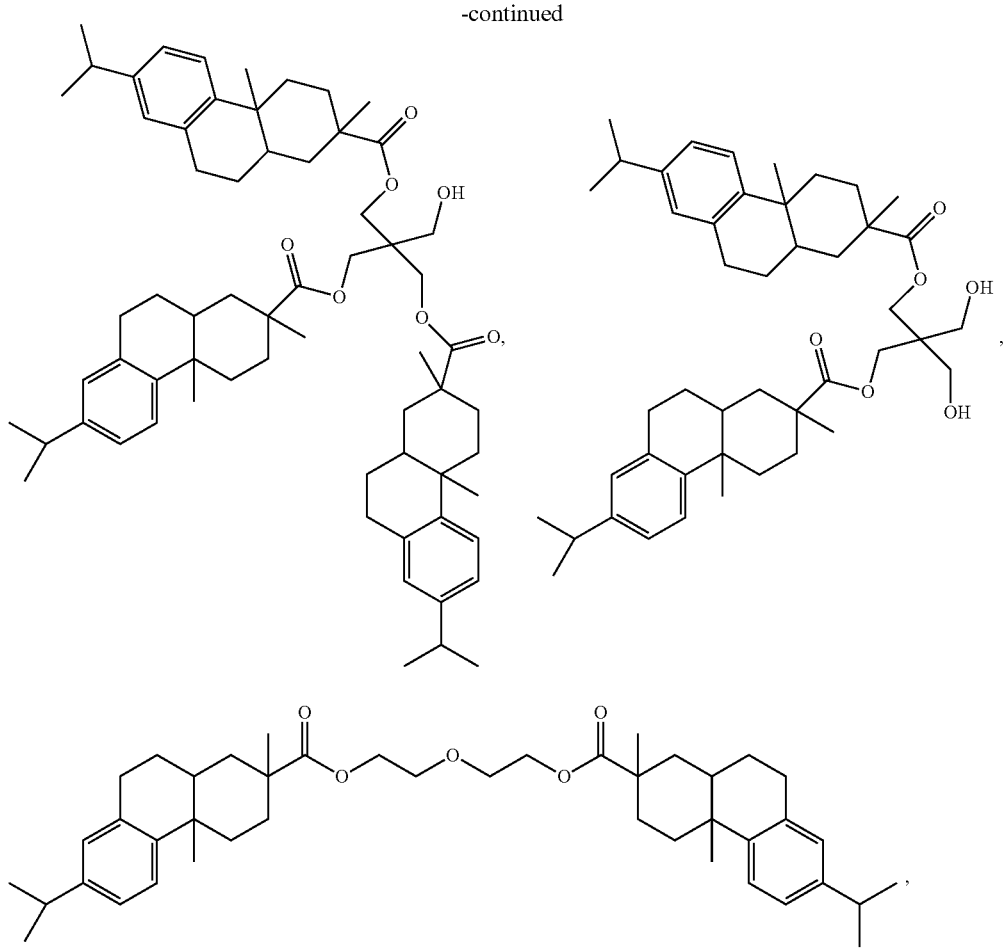

and mixtures thereof.

4. The phase change ink of claim 1, wherein amorphous component and the crystalline component comprise at least 80% by weight of bio-renewable content.

5. The phase change ink of claim 1 comprising at least about 70% by weight of bio-renewable content.

6. The phase change ink of claim 1, wherein the crystalline component is selected from the group consisting of distearyl terephthalate, didocosyl terephthalate, and mixtures thereof.

7. The phase change ink of claim 1, wherein the crystalline component is present in an amount of from about 60 percent to about 95 percent by weight of the total weight of the phase change ink.

8. The phase change ink of claim 1, wherein the amorphous component is present in an amount of from about 5 percent to about 40 percent by weight of the total weight of the phase change ink.

9. The phase change ink of claim 1, wherein the crystalline/amorphous ratio is from about 60:40 to about 95:5.

10. The phase change ink of claim 1, wherein the crystalline component has a viscosity of less than 12 cps at a temperature of about 140° C.

11. The phase change ink of claim 1, wherein the amorphous component has $T_g$ of from about −10° C. to about 30° C.

12. The phase change ink of claim 1, wherein the amorphous component does not exhibit a substantial increase in viscosity after being aged in an oven at 140° C. for 5 days.

13. The phase change ink of claim 1 having a viscosity of from about 1 to about 22 cps in a jetting range of from about 100 to about 140° C.

14. The phase change ink of claim 1 having a viscosity of greater than about $10^6$ cps at room temperature.

15. The phase change ink of claim 1 further comprising an additive selected from the group consisting of dispersant, synergist, antioxidant, defoamer, slip and leveling agents, clarifier, viscosity modifier, adhesive, plasticizer and mixtures thereof.

16. A phase change ink comprising:
    a crystalline component;
    an amorphous component being an aromatic rosin ester;
    a pigment; and
    a pigment dispersant.

17. The phase change ink of claim 16, wherein the pigment dispersant is an amine-based dispersant having a structure of Formula II:

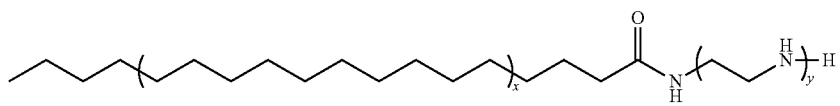

Formula II wherein x is from about 1 to about 10, and y is from about 10 to about 10,000.

18. The phase change ink of claim 16 having an average particle size of from about 50 nm to about 400 nm.

19. A phase change ink comprising:
a crystalline component;
an amorphous component being an aromatic rosin ester; and
a colorant, wherein the amorphous component and the crystalline component comprise at least 80% by weight of bio-renewable content.

20. The phase change ink of claim 19, wherein the aromatic rosin ester is selected from the group consisting of

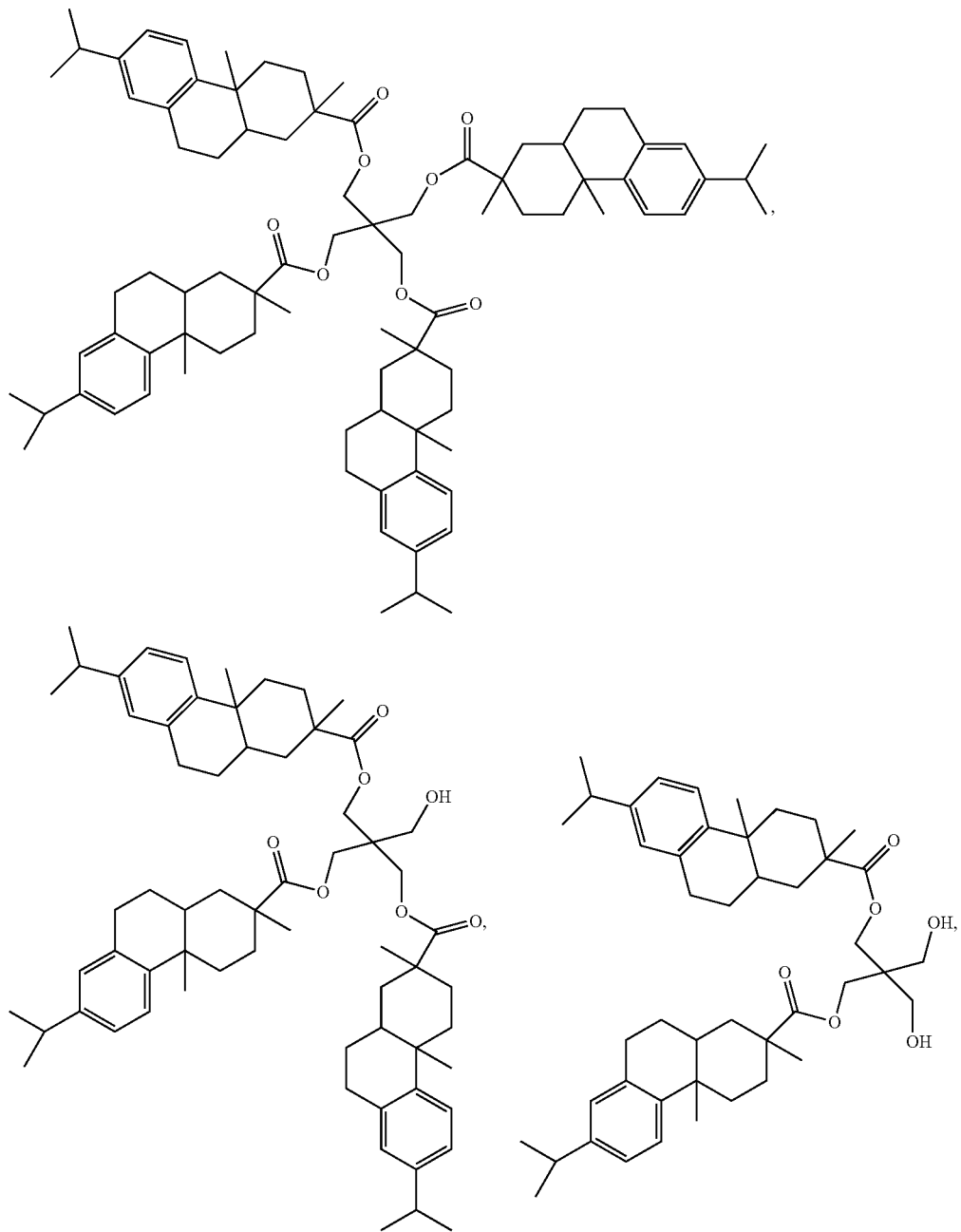

-continued
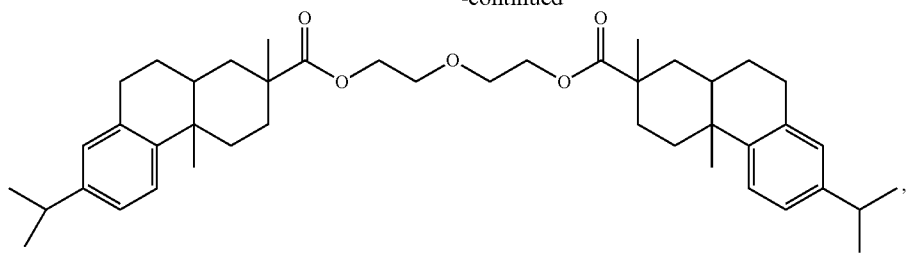
and mixtures thereof.
* * * * *